United States Patent [19]

Stanevich

[11] Patent Number: 5,764,057
[45] Date of Patent: Jun. 9, 1998

[54] SENSOR UNIT WITH SHELL STRUCTURE HAVING A DETENT STRUCTURE

[75] Inventor: Kenneth W. Stanevich, DeKalb, Ill.

[73] Assignee: TRW Inc., Lyndhurst, Ohio

[21] Appl. No.: 669,179

[22] Filed: Jun. 24, 1996

[51] Int. Cl.$^6$ ........................................ G01P 3/48
[52] U.S. Cl. ........................ 324/173; 324/207.25; 324/262
[58] Field of Search ................... 324/173, 174, 324/207.25, 207.2, 207.21, 262, 207.15, 207.16, 261; 384/446, 448; 336/90; 174/52.1

[56] References Cited

U.S. PATENT DOCUMENTS

| | | |
|---|---|---|
| 4,328,706 | 5/1982 | Akita et al. |
| 4,841,187 | 6/1989 | Hauke et al. |
| 5,129,743 | 7/1992 | Faye et al. ............................ 324/173 |
| 5,341,117 | 8/1994 | Singbartl .............................. 336/92 |
| 5,381,089 | 1/1995 | Dickmeyer et al. ................. 324/174 |
| 5,483,157 | 1/1996 | Nakatake et al. ................... 324/174 |
| 5,486,758 | 1/1996 | Hammerle ........................... 324/174 |
| 5,503,250 | 4/1996 | Schantz et al. ..................... 188/1.11 |
| 5,578,750 | 11/1996 | Haussler et al. ................... 73/120 |
| 5,629,618 | 5/1997 | Babin et al. ........................ 324/173 |

*Primary Examiner*—Walter E. Snow
*Assistant Examiner*—Jay M. Patidar
*Attorney, Agent, or Firm*—Tarolli, Sundheim, Covell, Tummino & Szabo

[57] ABSTRACT

A sensor unit (110) for use with a vehicle component housing (16) includes an electrical sensor assembly (12) and a sensor shell (14). The sensor assembly (12) has an inner portion (64) with an electrical pickup (20) which is electrically responsive to a condition inside the housing (16). The sensor assembly (12) further has an outer portion (30) with a pair of electrodes (24) for connection in an electrical circuit. The shell (14) has an installed position in which it supports the inner portion (64) of the sensor assembly (12) inside the housing (16) and supports the outer portion (30) of the sensor assembly (12) outside the housing (16). A detent structure (90–94) on the shell (14) snaps into interlocked engagement with the housing (16) upon movement of the shell (14) to the installed position.

18 Claims, 5 Drawing Sheets

SENSOR UNIT WITH SHELL STRUCTURE HAVING A DETENT STRUCTURE

FIELD OF THE INVENTION

The present invention relates to an electrical sensor assembly which senses a condition inside a vehicle component housing. The present invention particularly relates to a sensor unit including a sensor assembly and a shell for supporting the sensor assembly on a vehicle component housing.

BACKGROUND OF THE INVENTION

A vehicle component housing may contain hydraulic fluid for cooling and/or lubricating parts that move within the housing. For example, a vehicle transmission housing contains hydraulic fluid for cooling and lubricating gears that rotate within the transmission housing. An electrical sensor may be used to sense a condition inside the housing, such as the temperature of the hydraulic fluid or the speed of the rotating gears. Such a sensor extends through an opening in the housing. The sensor thus has an inner end inside the housing and an outer end outside the housing.

One type of sensor for use with a vehicle transmission housing comprises an assembly of interconnected sensor parts, including an electrical pickup, a pair of electrodes and a casing. The pickup is electrically responsive to a condition within the housing, e.g., fluid temperature or gear speed. The pickup is thus located at the inner end of the sensor. The electrodes are located at the outer end of the sensor for connection of the sensor in an electrical circuit. The pickup and the electrodes, as well as other electrical parts of the sensor, are supported by the casing.

The casing has an external screw thread for screwing the sensor through the corresponding opening in the housing. When the sensor is being screwed through the opening, an O-ring becomes compressed between the casing and the housing to provide a hydraulic fluid seal. Accordingly, the casing must be strong enough to withstand the torsional forces that are required to compress the O-ring when the sensor is being screwed through the opening.

A calibrated torque wrench is normally used to ensure that the sensor is installed correctly. Installation of the sensor thus requires several steps to be taken, including manual pre-positioning, a few manual rotations to avoid cross-threading, a power spin and a final torque wrench check. The power spin and the final torque wrench check can be combined. However, calibration of the torque wrench is critical to avoid breakage of the casing which may result from excessive torque, as well as to avoid leakage of the hydraulic fluid which may result from insufficient torque. Additionally, the opening in the transmission housing must have an internal screw thread to receive the external screw thread on the casing. This is a structural detail that increases the cost of the transmission housing.

When the sensor has been installed in the foregoing manner, the electrical pickup projects into the hydraulic fluid inside the transmission housing. The casing and the pickup must fit together closely and tightly enough to block the hydraulic fluid from leaking outward between the casing and the electrical parts of the sensor that are supported by the casing.

SUMMARY OF THE INVENTION

In accordance with the present invention, an apparatus for use with a vehicle component housing includes an electrical sensor assembly with an inner portion and an outer portion. The inner portion of the sensor assembly comprises an electrical pickup which is electrically responsive to a condition inside the housing. The outer portion of the sensor assembly comprises a pair of electrodes for connection in an electrical circuit.

The apparatus further includes a sensor shell with an installed position on the housing. When the shell is in the installed position, it supports the inner portion of the sensor assembly inside the housing, and supports the outer portion of the sensor assembly outside the housing. The shell includes a detent structure which snaps into interlocked engagement with the housing upon movement of the shell to its installed position.

An apparatus constructed in accordance with the present invention enables the sensor assembly to be installed without the use of screw threads. As a result, the sensor assembly is not subjected to the torsional forces that are required to engage screw threads. In a preferred embodiment of the present invention, the detent structure includes an alignment key which engages the housing to hold the shell in a predetermined orientation when the shell is being moved toward and into the installed position. The alignment key ensures that the shell, and hence the sensor assembly, will have a predetermined orientation relative to the housing when it is in the installed position, whereas screw threads could permit the sensor assembly to become rotationally displaced from a predetermined orientation.

In the preferred embodiment of the present invention, the outer portion of the sensor assembly projects from an open outer portion of the shell. The inner portion of the sensor assembly is contained in a closed inner portion of the shell. The closed inner portion of the shell isolates the pickup, as well as the other parts of the sensor assembly, from hydraulic fluid in the housing.

In accordance with a more specific feature of the present invention, the shell has a datum surface which abuts the housing when the shell is in the installed position. The electrical pickup has an end surface which abuts an inner end wall of the shell. The inner end wall is spaced a predetermined distance from the datum surface. The end surface of the pickup thus has a predetermined location within the housing when the shell is in the installed position.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figures 1, 7:
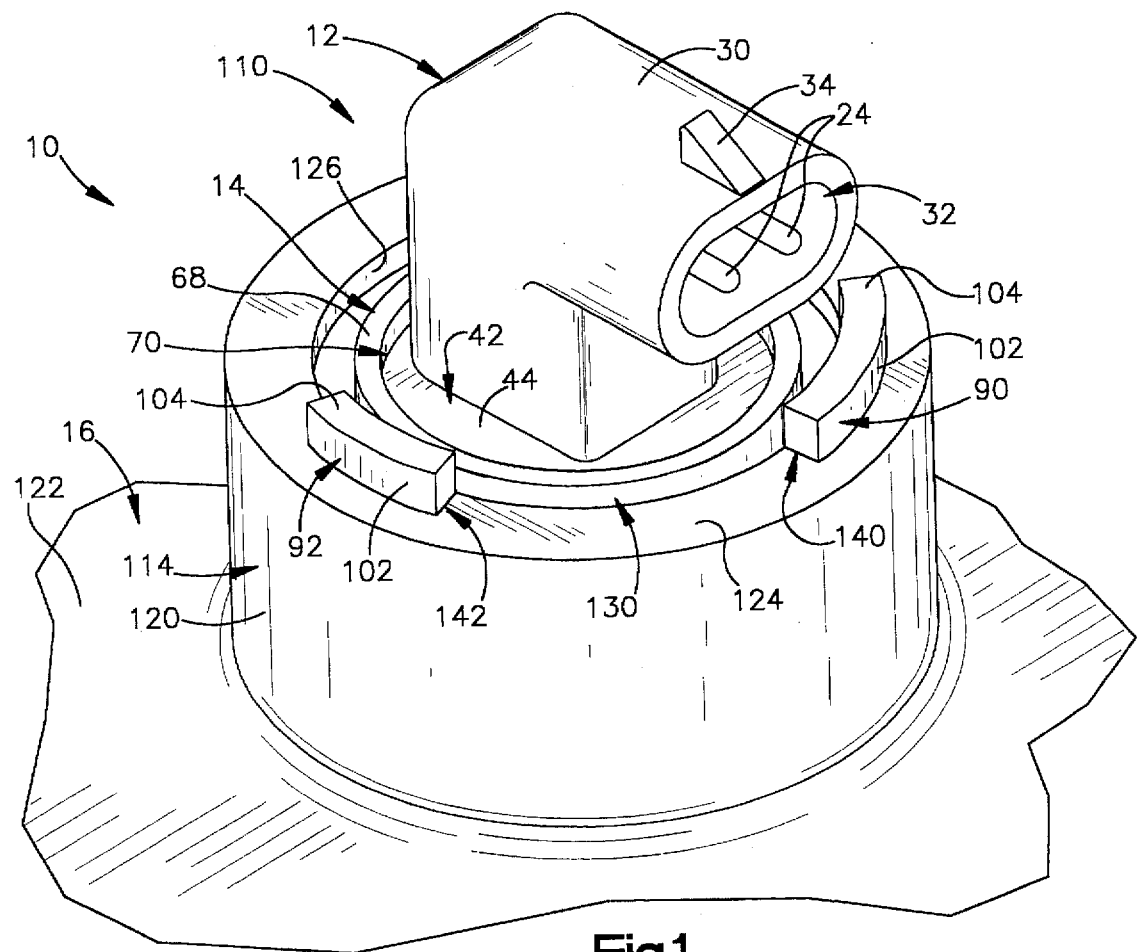
FIG. 1 is a perspective view of an apparatus comprising a preferred embodiment of the present invention.
FIG. 7 is an end view of another part shown in FIG. 1.

An apparatus 10 comprising a preferred embodiment of the present invention is shown in FIG. 1. The apparatus 10 includes an electrical sensor assembly 12 and a sensor shell 14. The sensor assembly 12 functions to sense a condition inside a vehicle component housing 16. The shell 14 contains and supports the sensor assembly 12 in an installed position extending into the housing 16. As an example of a housing that can be used in accordance with the present invention, the housing 16 is a vehicle transmission housing which, as known in the art, contains hydraulic fluid and transmission parts including gears. As an example of a sensor assembly that can be used in accordance with the present invention, the sensor assembly 12 comprises a speed sensor which senses the speed of a gear rotating within the housing 16.

Figure 2:
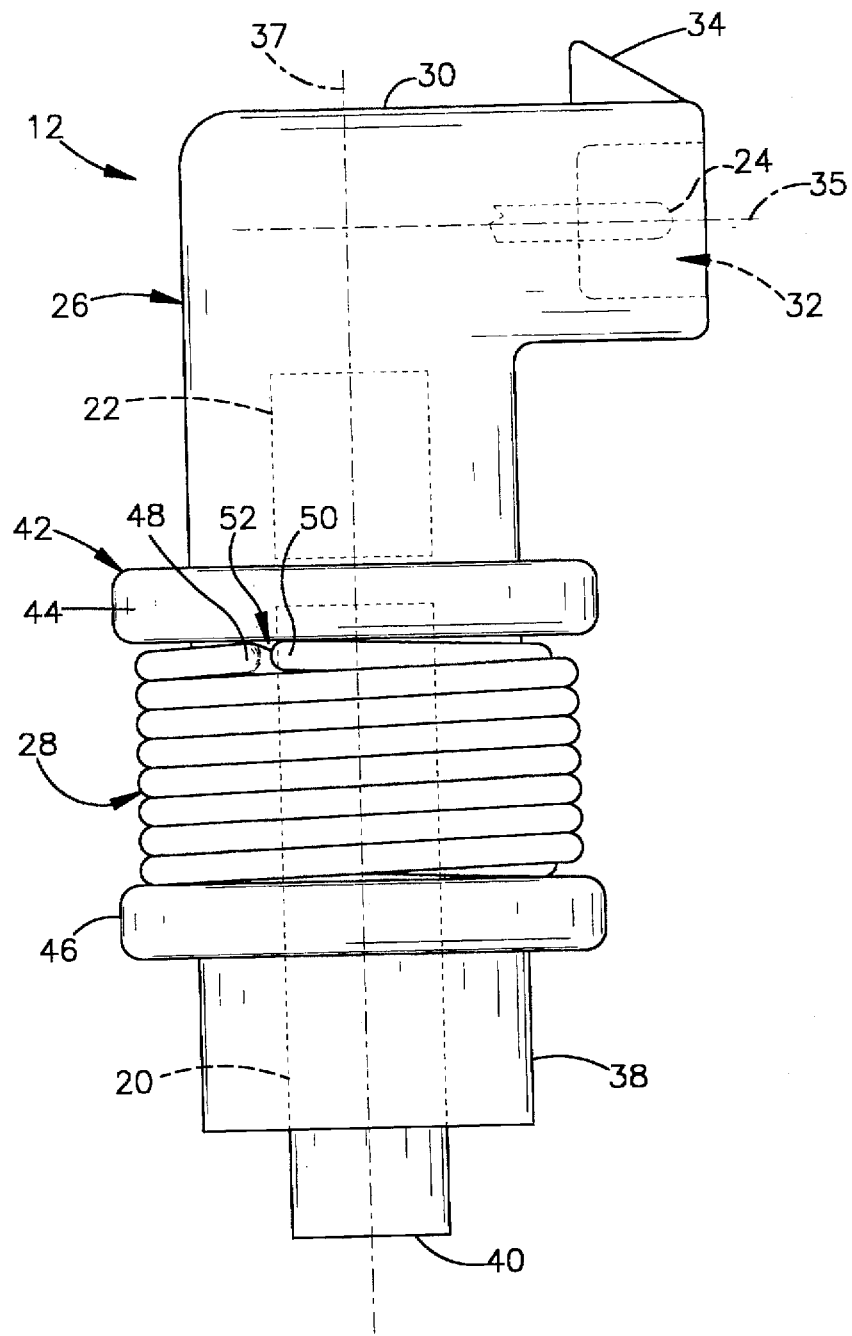
FIG. 2 is an enlarged, partly schematic side view of parts shown in FIG. 1.

As shown in FIG. 2, the sensor assembly 12 includes a plurality of parts which are interconnected as a preassembled unit separately from the shell 14 and the housing 16. The interconnected parts of the sensor assembly 12 include an iron core 20, a magnet 22, and a pair of electrode pins 24, one of which is shown in the side view of FIG. 2. The interconnected parts of the sensor assembly 12 further include a plastic casing 26 and a coil 28.

The casing 26 contains the core 20, the magnet 22 and the electrode pins 24. An upper end portion 30 of the casing 26 defines a socket 32 in which the electrode pins 24 are exposed for connection in an electrical circuit. A tab 34 on the upper end portion 30 engages an electrical connector (not shown) with the socket 32 in a known manner. In the preferred embodiment of the present invention, the socket 32 is open in a direction extending outward along a transverse axis 35 of the casing 26 which is perpendicular to a longitudinal axis 37. The casing 26 is formed of electrically non-conductive material, and is most preferably formed of a plastic material.

The core 20 is an elongated cylindrical part centered on the longitudinal axis 37, and projects a short distance outward from a lower end portion 38 of the casing 26. A polished end surface 40 of the core 20 is thus located outside the casing 26 at the lower end of the sensor assembly 12. The magnet 22 also is a cylindrical part centered on the longitudinal axis 37, and is supported by the casing 26 in a position spaced a short distance from the upper end of the core 20.

An intermediate portion 42 of the casing 26 defines a bobbin for the coil 28. A circular flange 44 defines the upper end of the bobbin 42. Another circular flange 46 defines the lower end of the bobbin 42. The coil 28 is wound around the bobbin 42 between the flanges 44 and 46, and has opposite end portions 48 and 50 extending inward through an aperture 52 in the casing 26. The opposite end portions 48 and 50 of the coil 28 are connected with corresponding inner end portions (not shown) of the electrode pins 24 within the casing 26. Such connections can be made in any suitable manner known in the art. In this arrangement, the interconnected parts of the sensor assembly 12 together define a variable reluctance device in which the core 20 functions as an electrical pickup in response to movement of a metal object past the end surface 40. The sensor assembly 12 thus functions to sense the speed of the object, as known in the art.

Figure 3:
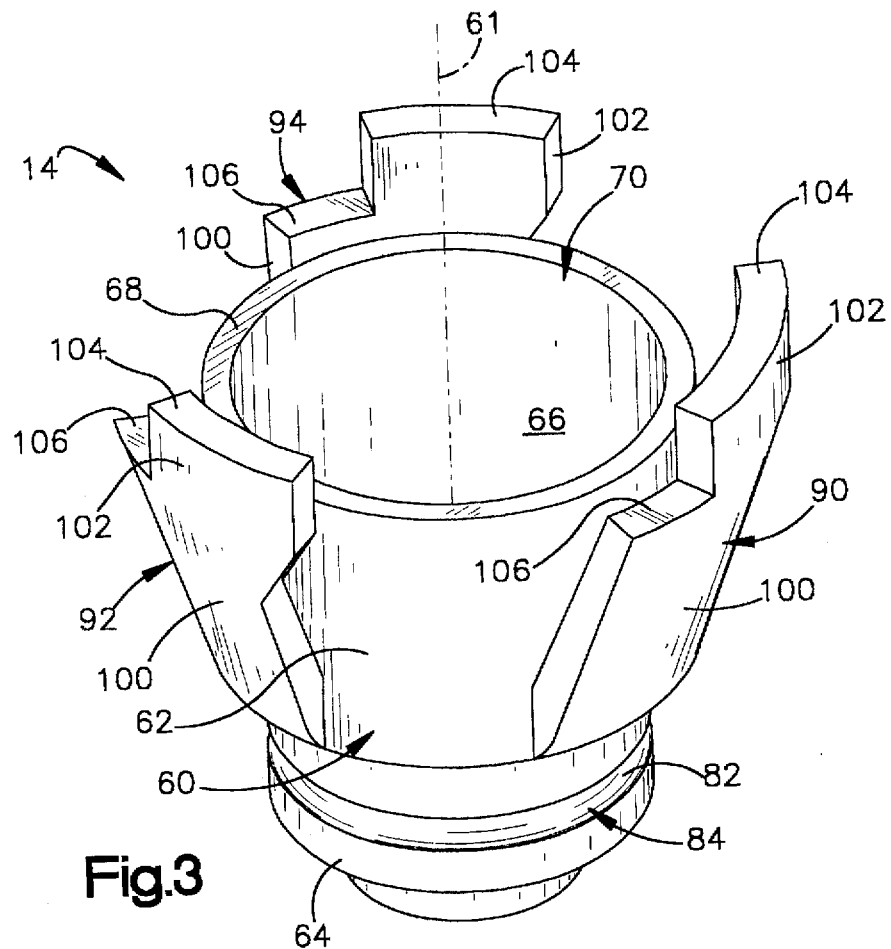
FIG. 3 is a perspective view of a part shown in FIG. 1.
Figure 4:
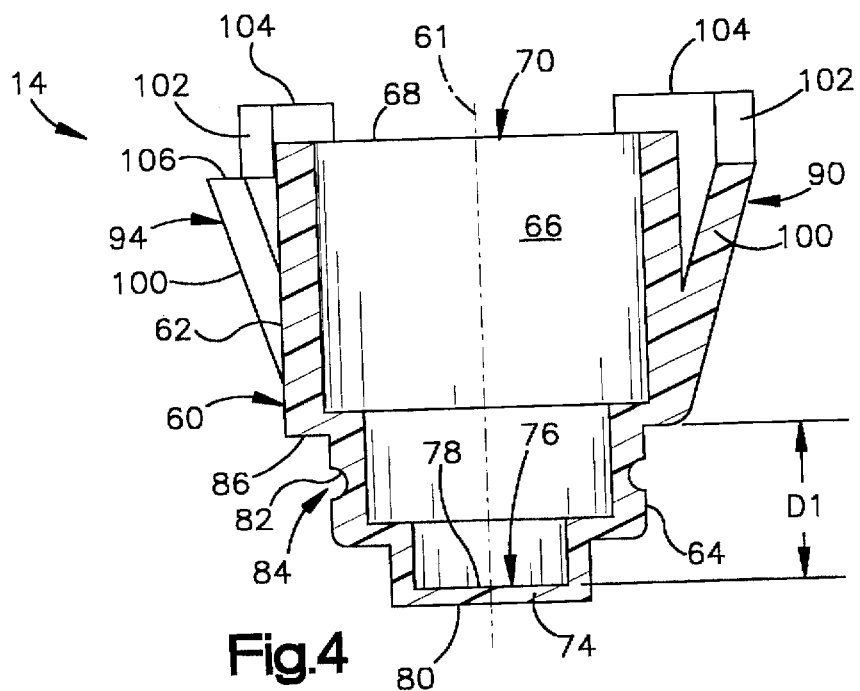
FIG. 4 is a partly sectional side view of the part shown in FIG. 3.

As shown separately in FIGS. 3 and 4, the shell 14 has a cylindrical body 60 with a longitudinal central axis 61, an upper portion 62, and a reduced diameter lower portion 64. The upper and lower portions 62 and 64 of the cylindrical body 60 together define a cylindrical chamber 66 centered on the axis 61. An annular upper end surface 68 of the upper portion 62 defines an open upper end 70 of the chamber 66.

The lower portion 64 of the cylindrical body 60 has a circular end wall 74 defining a closed lower end 76 of the chamber 66.

The end wall 74 has upper and lower side surfaces 78 and 80 which are perpendicular to the axis 61. A recessed outer surface 82 of the lower portion 64 defines a circumferentially extending groove 84. An annular outer surface 86 projects radially outward from the lower portion 64 in a plane perpendicular to the axis 61, and faces axially downward from the upper portion 62. The annular outer surface 86 is a datum surface which is axially spaced a predetermined distance D1 from the upper side surface 78 of the end wall 74.

The shell 14 further includes first, second and third detent arms 90, 92 and 94. The detent arms 90–94 project axially upward and radially outward from the upper portion 62 of the cylindrical body 60 and are pivotally flexible radially inward toward the upper portion 62. Each of the detent arms 90–94 has a lower portion 100 and an upper portion 102. The upper portions 102 have end surfaces 104 in a common plane perpendicular to the axis 61. The lower portions 100 also have end surfaces 106 in a common plane perpendicular to the axis 61. Moreover, each of the detent arms 90–94 has an arcuate contour extending circumferentially around the axis 61. The upper portion 102 of the first detent arm 90 has a greater length, as measured circumferentially around the axis 61, than the upper portions 102 of the second and third detent arms 92 and 94.

Figure 5:
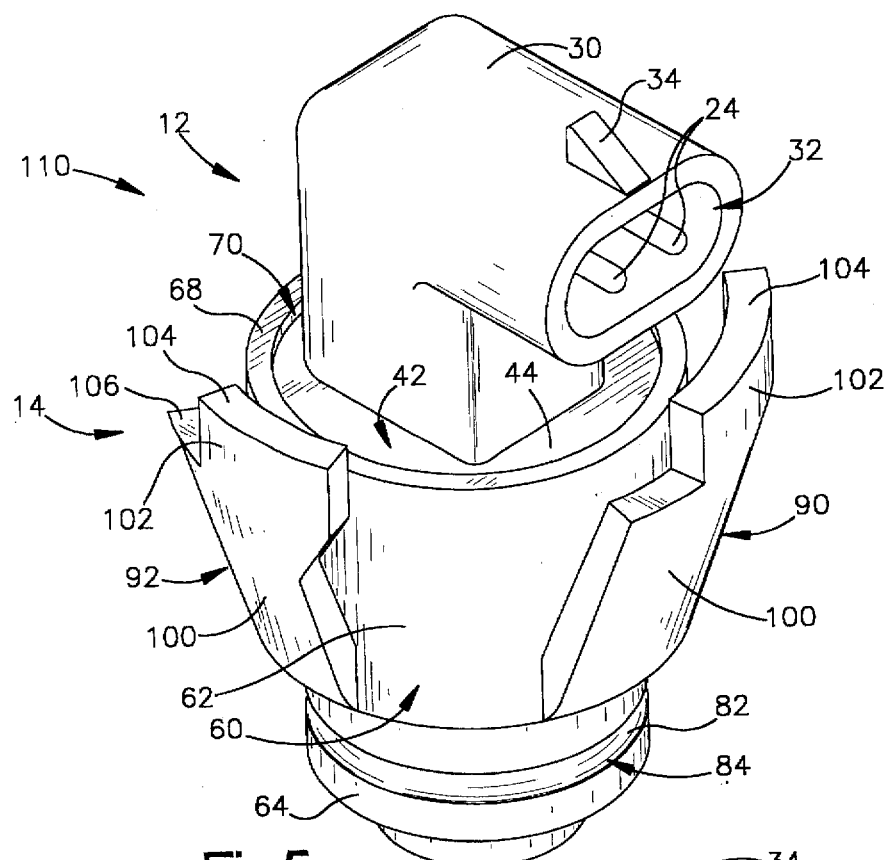
FIG. 5 is a perspective view showing the parts of FIGS. 2 and 3 in an interconnected relationship.
Figure 6:
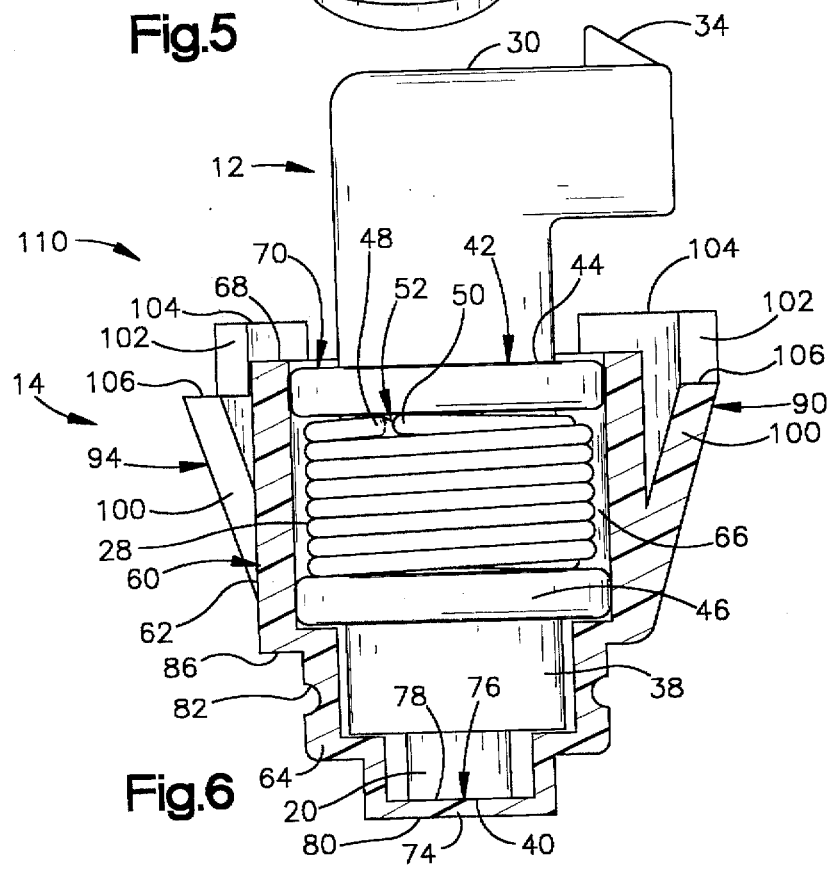
FIG. 6 is a partly sectional side view of the parts shown in FIG. 5.

As shown in FIGS. 5 and 6, the sensor assembly 12 is received within the shell 14. The upper end portion 30 of the casing 26 projects from the open end 70 of the chamber. The bobbin 42 and the lower end portion 38 of the casing 26 are received within the chamber 66. The flange 44 at the upper end of the bobbin 42 is fixed and sealed to the surrounding body 60 of the shell 14 circumferentially entirely around the axis 61 so as to close and seal the compartment 66. This can be accomplished in any suitable manner known in the art, such as by the use of heat-staking, laser welding, adhesives, or the like. The coil 28 and the core 20 are thus isolated from contaminants that might otherwise enter the chamber 66 through the open end 70. Importantly, the end surface 40 of the core 20 abuts the upper side surface 78 of the end wall 74. This ensures that the end surface 40 is spaced the predetermined distance D1 from the datum surface 86. When the sensor assembly 12 has been received and fixed within the shell 14 in this manner, the sensor assembly 12 and the shell 14 together define a sensor unit 110.

With further reference to FIG. 1, the housing 16 has a projection 114 in which the sensor unit 110 is installed. The projection 114 preferably has a cylindrical body wall 120 with a longitudinal central axis 121 (FIG. 7). The body wall 120 projects axially upward, as viewed in FIG. 1, from an outer wall 122 of the housing 16.

As best shown in FIG. 7, a circular end wall 124 of the projection 114 has an inner edge surface 126. The inner edge surface 126 defines a circular opening 130 which is centered on the axis 121. The inner edge surface 126 further defines first, second and third slots 140, 142 and 144 which project radially outward from the circular opening 130. The first, second and third slots 140, 142 and 144 have circumferentially extending lengths that are equal to the lengths of the upper portions 102 (FIG. 3) of the first, second and third detent arms 90, 92 and 94, respectively. The slots 140 are spaced circumferentially from each other by three arcuate sections 146 of the end wall 124.

As further shown in FIG. 7, the housing wall 122 has an inner edge surface 150 located radially within the body wall 120 of the projection 114. The inner edge surface 150 defines a circular opening 154 which also is centered on the axis 121. An outer side surface 156 of the housing wall 122 surrounds the opening 154.

Figure 8:
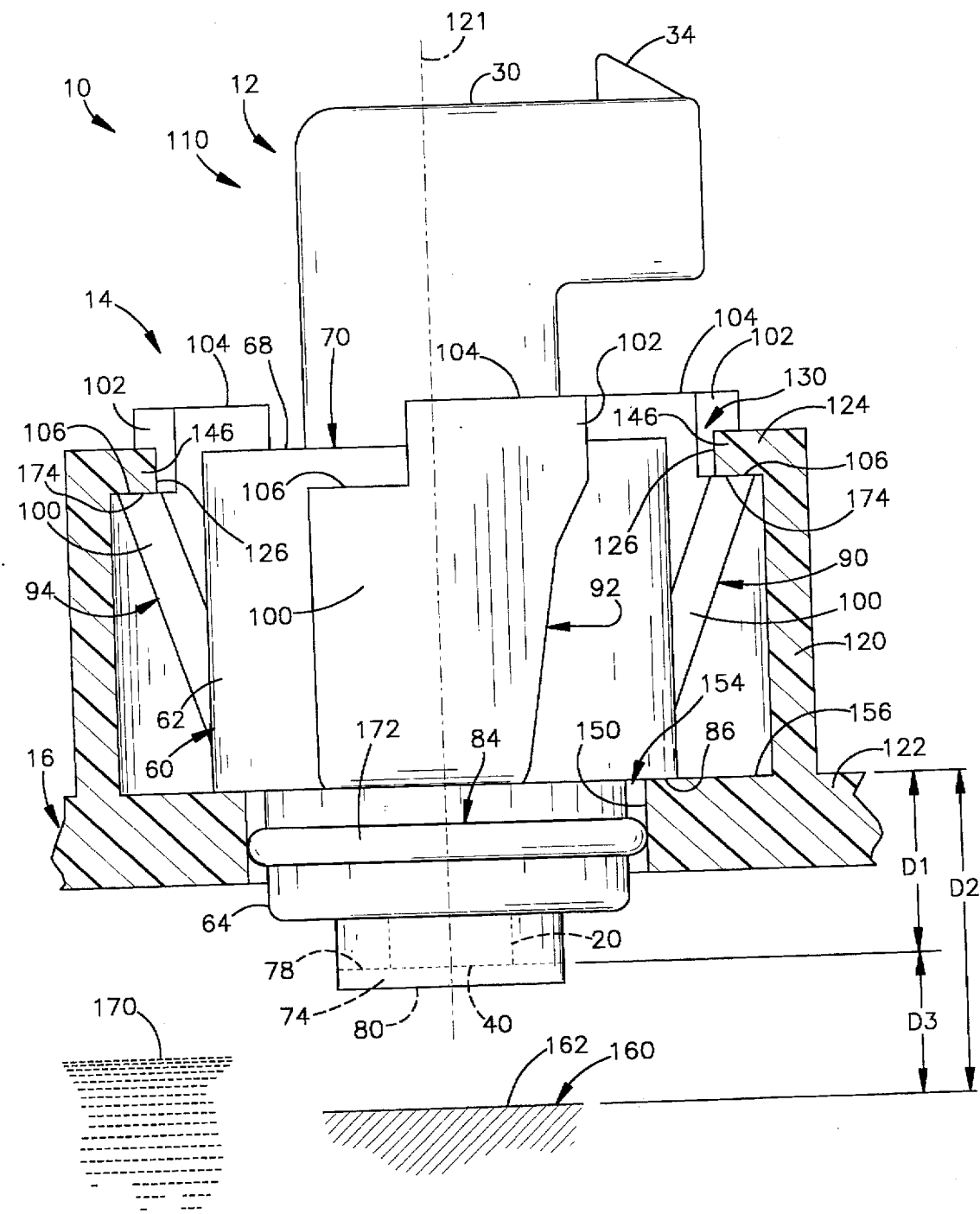
FIG. 8 is a partly sectional side view of the parts shown in FIG. 1.

When the sensor unit 110 (FIGS. 5 and 6) is being placed in the installed position of FIG. 1, it is moved axially downward into the projection 114 until the datum surface 86 on the shell 14 moves into abutment with the outer side surface 156 of the housing wall 122, as shown in FIG. 8. The lower portion 64 of the shell 14 then projects into the housing 16 through the opening 154 such that the end surface 40 of the core 20 is located within the housing 16.

As shown schematically in FIG. 8, the housing 16 contains a gear 160 with a radially outer surface 162. The surface 162 of the gear 160 is spaced a predetermined distance D2 from the outer side surface 156 of the housing wall 122. The end surface 40 of the core 20 is thus spaced a predetermined distance D3 from the surface 162 of the gear 160. This ensures that the end surface 40 of the core 20 will function as an electrical pickup surface in a predetermined manner when the sensor assembly 12 is used to measure the speed of the gear 160 rotating within the housing 16. In accordance with this feature of the present invention, the end wall 74 of the shell 14 and, preferably the entire shell 14, is formed of electrically non-conductive material. The shell 14 is most preferably constructed as a continuous body of plastic material. Recommended plastic materials include glass reinforced nylon and FORTRON (a trademark of Hoechst Celanese Corp.) glass reinforced PPS.

Hydraulic fluid 170 (also shown schematically in FIG. 8) is contained in the housing 16 for lubrication and cooling of the gear 160. Since the chamber 66 is closed at its lower end 76 (FIG. 4), the core 20 and the other parts of the sensor assembly 12 are isolated from the hydraulic fluid 170. An O-ring 172 is received in the groove 84 to block the hydraulic fluid 170 from leaking outward through the opening 154 in the housing wall 122.

As further shown in FIG. 8, the detent arms 90, 92 and 94 on the shell 14 interlock the sensor unit 110 with the housing 16 when the sensor unit 110 is in its installed position. As the detent arms 90–94 are moved axially downward into the projection 114, their lower portions 100 are pivotally flexed radially inward by the arcuate sections 146 of the end wall 124 that are located circumferentially between the slots 140–144. When the sensor unit 110 reaches the installed position, the lower portions 100 of the detent arms 90–94 snap radially outward beneath the arcuate sections 146 of the end wall 124. Their upper end surfaces 106 abut an inner side surface 174 of the end wall 124 to block movement of the sensor unit 110 axially upward from the projection 114.

When the lower portions 100 of the detent arms 90–94 snap radially outward beneath the end wall 124 of the projection 114, the upper portions 102 simultaneously move radially outward in the slots 140–144. The corresponding lengths of the first slot 140 and the upper portion 102 of the first detent arm 90 ensure that the detent arms 90, 92 and 94 will be received in their corresponding slots 140, 142 and 144. The first detent arm 90 thus functions as an alignment key which guides the sensor unit 110 to move toward and into its installed position in a predetermined orientation circumferentially about the axis 121. This is important for alignment of the socket 32 with an associated electrical connector. When the sensor unit 110 is to be removed from the housing 16, the upper portions 102 of the detent arms 90–94 are depressed, i.e., moved radially inward, so as to slide the lower portions 100 radially inward from the end wall 124. The sensor unit 110 can then be moved axially outward from the projection 114.

From the above description of the invention, those skilled in the art will perceive improvements, changes and modifications. For example, in the preferred embodiment of the present invention, the upper portion 102 of the first detent arm 90 functions as an alignment key as a result of its greater length. The same result could be obtained by the use of equally-sized detent arms which are spaced and/or oriented relative to each other so as to interlock with a vehicle component housing in only one orientation. Such improvements, changes and modifications within the skill of the art are intended to be covered by the appended claims.

Having described the invention, the following is claimed:

1. Apparatus for use with a vehicle component housing, said apparatus comprising:

an electrical sensor assembly having an inner portion and an outer portion, said inner portion of said sensor assembly comprising an electrical pickup which is electrically responsive to a condition inside the housing, said outer portion of said sensor assembly comprising a pair of electrodes for connection in an electrical circuit; and a sensor shell having an installed position in which said shell supports said inner portion of said sensor assembly inside the housing and supports said outer portion of said sensor assembly outside the housing, said shell including a detent structure which snaps into interlocked engagement with the housing upon movement of said shell to said installed position;

wherein said outer portion of said sensor assembly projects from an open outer portion of said shell, said inner portion of said sensor assembly being contained in a closed inner portion of said shell which isolates said sensor assembly from hydraulic fluid in the housing.

2. Apparatus as defined in claim 1 wherein said shell has an axis and an alignment key which engages the housing to hold said shell in a predetermined orientation circumferentially about the axis when said shell is being moved toward and into said installed position.

3. Apparatus as defined in claim 1 wherein said closed inner portion of said shell has an inner end wall, said electrical pickup having an inner end surface abutting said inner end wall.

4. Apparatus as defined in claim 3 wherein said sensor assembly comprises a variable reluctance device including a magnet, a coil, and a metal core, said core comprising electrical pickup.

5. Apparatus as defined in claim 4 wherein said condition is the speed of a gear rotating in the housing.

6. Apparatus as defined in claim 1 wherein said shell has a datum surface which moves into abutment with the housing upon movement of said shell to said installed position, said electrical pickup having an inner end surface spaced a predetermined distance from said datum surface, whereby said inner end surface of said electrical pickup is moved a predetermined distance into said housing upon movement of said shell to said installed position.

7. Apparatus as defined in claim 1 wherein said shell is free of a screw thread for engaging the housing.

8. Apparatus as defined in claim 1 wherein said shell consists of a continuous body of electrically non-conductive material.

9. Apparatus as defined in claim 1 wherein said sensor assembly and said shell are interconnected as a sensor unit separate from the housing.

10. Apparatus for use with a vehicle component housing, said apparatus comprising:

an electrical sensor assembly having an inner portion and an outer portion, said inner portion of said sensor assembly comprising an electrical pickup which is electrically responsive to a condition inside the housing, said outer portion of said sensor assembly comprising a pair of electrodes for connection in an electrical circuit; and a sensor shell having an installed position in which said shell supports said inner portion of said sensor assembly inside the housing and supports said outer portion of said sensor assembly outside the housing, said shell including a detent structure which snaps into interlocked engagement with the housing upon movement of said shell to said installed position;

wherein said shell has an alignment key which engages the housing to hold said shell in a predetermined orientation when said shell is being moved toward and into said installed position; and wherein said detent structure includes a plurality of flexible detent members, one of said detent members comprising said alignment key.

11. Apparatus as defined in claim 10 wherein said outer portion of said sensor assembly projects from an open outer portion of said shell, said inner portion of said sensor assembly being contained in a closed inner portion of said shell which isolates said sensor assembly from hydraulic fluid in the housing.

12. Apparatus as defined in claim 10 wherein said closed inner portion of said shell has an inner end wall, said electrical pickup having an inner end surface abutting said inner end wall.

13. Apparatus as defined in claim 12 wherein said sensor assembly comprises a variable reluctance device including a magnet, a coil, and a metal core, said core comprising said electrical pickup.

14. Apparatus as defined in claim 13 wherein said condition is the speed of a gear rotating in the housing.

15. Apparatus as defined in claim 10 wherein said shell has a datum surface which moves into abutment with the housing upon movement of said shell to said installed position, said electrical pickup having an inner end surface spaced a predetermined distance from said datum surface, whereby said inner end surface of said electrical pickup is moved a predetermined distance into said housing upon movement of said shell to said installed position.

16. Apparatus as defined in claim 10 wherein said shell is free of a screw thread for engaging the housing.

17. Apparatus as defined in claim 10 wherein said shell consists of a continuous body of electrically non-conductive material.

18. Apparatus as defined in claim 10 wherein said sensor assembly and said shell are interconnected as a sensor unit separate from the housing.

* * * * *